United States Patent [19]
Pott

[11] Patent Number: 5,549,873
[45] Date of Patent: Aug. 27, 1996

[54] EXHAUST GAS CONVERTER ARRANGEMENT

[75] Inventor: Ekkehard Pott, Gifhorn, Germany

[73] Assignee: Volkswagen AG, Wolfsburg, Germany

[21] Appl. No.: 387,027

[22] Filed: Feb. 10, 1995

[30] Foreign Application Priority Data

Feb. 18, 1994 [DE] Germany .................. 44 05 158.1

[51] Int. Cl.6 .................. B01D 53/34; F01N 3/28
[52] U.S. Cl. .................. 422/180; 422/171; 422/177; 422/211; 422/222; 502/527
[58] Field of Search .................. 422/169–170, 422/171, 177, 179–180, 211, 222; 502/439, 527; 60/299; 428/593

[56] References Cited

U.S. PATENT DOCUMENTS

| | | | |
|---|---|---|---|
| 4,152,302 | 5/1979 | Nonnenman et al. | 502/527 |
| 4,556,543 | 12/1985 | Mochida et al. | 60/299 |
| 4,987,034 | 1/1991 | Hitachi et al. | 422/180 |
| 5,041,270 | 8/1991 | Fujitani et al. | 423/213.2 |
| 5,174,968 | 12/1992 | Whittenberger | 422/174 |
| 5,317,869 | 6/1994 | Takeuchi | 422/174 |
| 5,436,216 | 7/1995 | Toyao et al. | 422/174 |

*Primary Examiner*—Robert Warden
*Assistant Examiner*—Hien Tran
*Attorney, Agent, or Firm*—Brumbaugh, Graves, Donohue & Raymond

[57] ABSTRACT

An exhaust gas converter arrangement includes a common catalyst support with a precatalyst section and a main catalyst section of larger size downstream in the direction of exhaust flow. The common support is made of alternate corrugated and flat sheet metal members wound into cylindrical shape. Between the precatalyst section and the main catalyst section, the support has an intermediate region in which the sheet metal members are formed with apertures to minimize heat conduction between the catalyst sections.

5 Claims, 2 Drawing Sheets

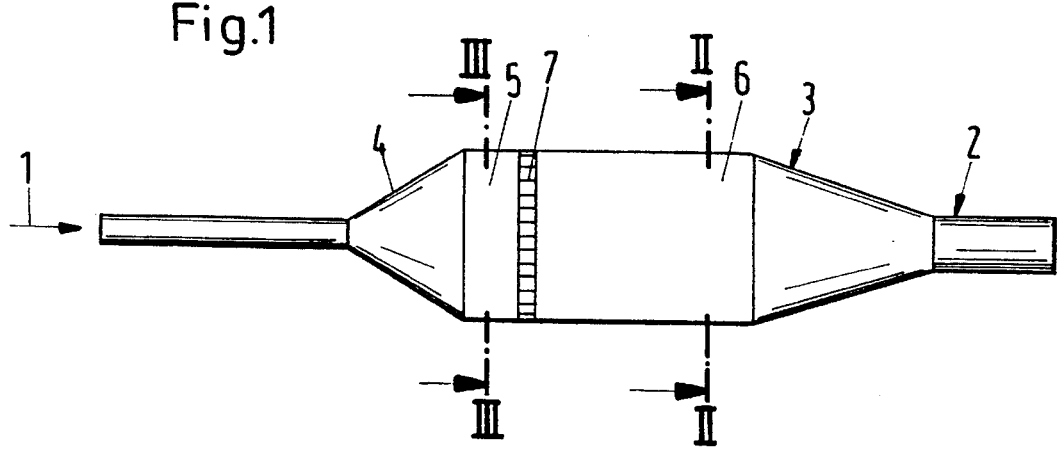
Fig.1
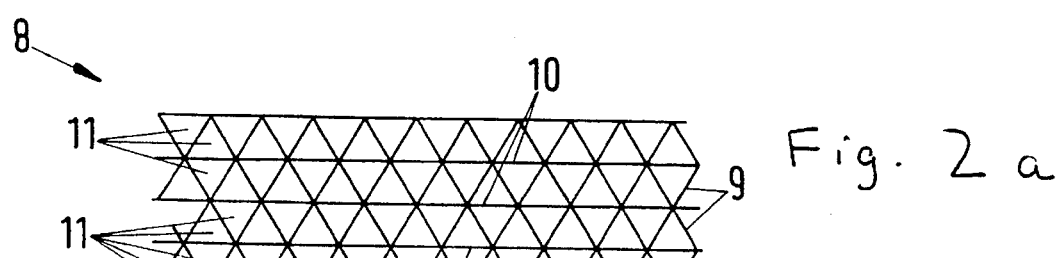
Fig. 2a
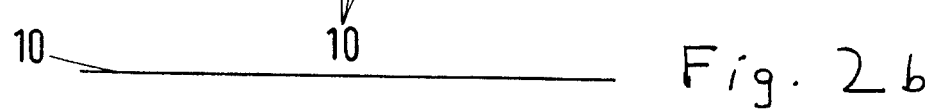
Fig. 2b
Fig. 2c
Fig.3
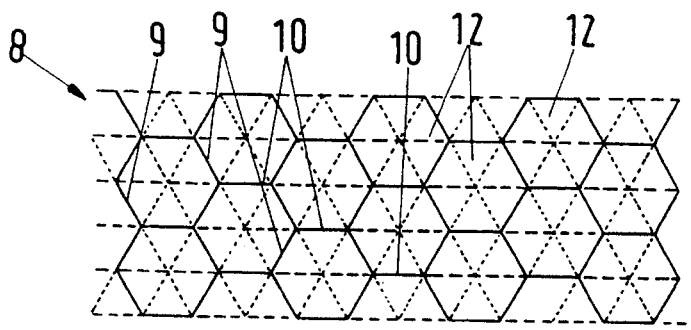

EXHAUST GAS CONVERTER ARRANGEMENT

BACKGROUND OF THE INVENTION

This invention relates to exhaust gas converters of the type used for cleaning the exhaust gases from motor vehicle internal combustion engines.

In order to take into account the fact that, during a cold start, the catalytically-active material of a catalytic converter is below its start-up temperature and must be brought to its operating temperature by the exhaust gases of the engine, the active component of conventional exhaust gas converters may be divided into a comparatively small precatalyst located on the exhaust gas inlet side of the converter and a larger main catalyst located downstream in the direction of exhaust flow. The smaller the mass of catalyst to be heated, the quicker it will reach its start-up temperature. Consequently, the exhaust gases are first allowed to enter a comparatively small precatalyst that will be heated to its start-up temperature comparatively quickly and will thereafter give off heat to the exhaust gases by its exothermic catalytic action. In this way, not only will exhaust cleaning be at least partly effected very shortly after the cold start, but also the main catalyst will be heated comparatively quickly.

A disadvantage of this exhaust gas converter arrangement is the need to provide two catalyst supports having different sizes. For example, when the catalyst supports are made by winding layers of sheet metal, they must be wound to two different sizes. Moreover, the two different supports must be mounted in the housing for the exhaust gas converter in such a way that, first, they can withstand the dynamic stresses imposed, for example, during operation of a vehicle equipped with the converter and, second, appropriate allowances are made for thermal changes of dimensions.

U.S. Pat. No. 5,041,270 discloses an exhaust gas converter arrangement in which an oxidizing catalyst and a reducing catalyst are provided in series on a common porous, monolithic support. This converter arrangement, however, does not include a precatalyst and a main catalyst having the same catalytic reaction, nor does it include a catalytic converter support made by winding layers of sheet metal. Also, this conventional monolithic design principle cannot simply be applied to exhaust gas converters consisting of a precatalyst and a main catalyst on a wound sheet metal support because, at least during the cold-start phase of the engine, the direct conduction of heat from the precatalyst to the main catalyst must be kept as small as possible. Otherwise, the heating time required for start-up of the precatalyst, and hence the time before it can begin to supply heat to the main catalyst, would be prolonged.

SUMMARY OF THE INVENTION

Accordingly, it is an object of the present invention to provide an exhaust gas converter arrangement having a precatalyst and a main catalyst common on a wound sheet metal support which overcomes the disadvantages of the prior art.

Another object of the invention is to provide an exhaust gas converter arrangement of this type which has a reduced manufacturing cost for the two catalyst supports while retaining the advantages of the wound sheet metal support structure.

These and other objects of the invention are attained by providing a sheet metal catalyst support structure having a precatalyst region in which a precatalyst is applied to the support structure and a main catalyst region in which a main catalyst is applied to the same support structure and an intermediate zone between those regions which is provided with apertures in the sheet metal to reduce conduction of heat. The sheet metal in the intermediate zone is reduced by the apertures to 75% or less of its original strength. Advantageously, the reduction is down to 50% or less and especially 25% or less.

With this arrangement, the conventional established sheet metal winding technique can be used for the two catalyst support regions while maintaining adequate thermal insulation between the two regions. The invention thus makes it possible to use a single wound sheet metal support for the two catalysts by providing an intermediate region between the support areas assigned to the two catalysts of considerably reduced heat conductivity, which is accomplished by forming recesses or apertures in the sheet metal members of the common support. Therefore, the teaching of the invention is not limited to the use of a common support for both catalysts, nor even a support wound out of sheet metal, but to a common wound sheet metal support for both catalysts which provides an intermediate region of reduced thermal conductivity to assure a rapid temperature rise in the precatalyst after cold-start of the engine producing the exhaust gases received by the converter.

In a preferred embodiment of the invention, the wound sheet metal catalyst support is arranged to provide exhaust passages of generally square or triangular cross-section in the main catalyst region as a result of the corrugated shape of a sheet metal member and exhaust passages having a honeycomb-like cross-section in the precatalyst region resulting from additional openings formed in the sheet metal members. By providing such additional recesses or apertures in the sheet metal members of the common support, a reduction of the mass of the precatalyst to be rapidly heated immediately after a cold start of the engine is effected. At the same time, the sheet metal support forms a considerably larger number of exhaust flowpaths in the region of the main catalyst so that a larger active surface area of catalyst is provided in that region.

BRIEF DESCRIPTION OF THE DRAWINGS

Further objects and advantages of the invention will be apparent from a reading of the following description in conjunction with the accompanying drawings, in which:

FIG. 1 is a schematic longitudinal sectional view illustrating a representative embodiment of an exhaust gas converter arrangement according to the invention;

FIGS. 2A and 3 are cross-sectional views of the converter arrangement shown in FIG. 1 in unwound condition taken on the lines II—II and III—III, respectively, and looking in the direction of the arrows;

FIGS. 2B and 2C are end views showing typical uncorrugated and corrugated sheet metal members used to form the catalyst support of the invention;

DESCRIPTION OF PREFERRED EMBODIMENT

Figure 4:
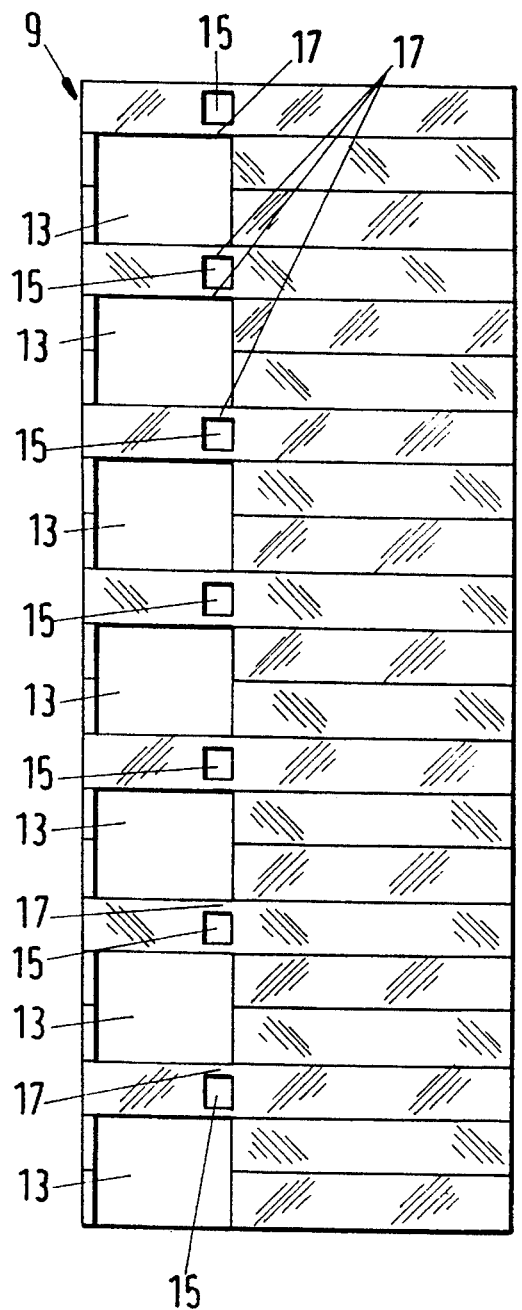
FIG. 4 is a plan view showing the configuration of a representative sheet metal member used in forming the catalyst support prior to being corrugated.

In the typical embodiment of the invention shown in FIG. 1, exhaust gas from an internal combustion engine is supplied in the direction indicated by the arrow 1 to an exhaust gas converter arrangement 2. In the exhaust gas converter arrangement 2, an exhaust gas converter 3 consisting of a precatalyst 5 and a main catalyst 6 is mounted in a common housing 4. The two catalysts 5 and 6 have a common support 8 which is made of a corrugated sheet metal member 9 and an uncorrugated sheet metal member 10, shown in FIGS. 2B and 2C, which are brazed or welded together at the edges of the corrugations and wound into a cylindrical configuration. Also an unwound configuration or non-cylindrical wounded configuration are possible. In accordance with the invention, the catalyst support is arranged with an intermediate zone 7 of lower heat conductivity between the two catalysts 5 and 6 so that the conduction of heat from the precatalyst 5, which is heated first, to the main catalyst 6, is substantially reduced.

FIGS. 2A and 3 show the conformation or shape in unwound condition of the exhaust gas passages, which extend perpendicular to the plane of the drawing in FIGS. 2A and 3, at the cross-sections indicated in FIG. 1 of the catalyst support 8. FIG. 2C shows the corrugated sheet metal member 9 having more or less zig-zag configuration, which might be replaced by a rectangular, rounded or meandering configuration, while FIG. 2B shows the uncorrugated, i.e., smooth, sheet metal member 10. In the region of the main catalyst 6, these two sheet metal members 9 and 10 or a plurality thereof are wound one over the other in alternating sequence without additional features such as recesses or apertures, thus forming generally triangular flow passages 11, but generally square flow passages may be provided if the corrugations have a correspondingly rectangular shape.

In the region of the precatalyst 5 shown in FIG. 3, on the other hand, honeycomb-like flow passages 12 are formed by punching regions out of the portions of the corrugated sheet metal member 9 which are shown in dotted lines in FIG. 3 and the portions of the uncorrugated member 10 shown by dashed lines in FIG. 3 throughout most of the length of the precatalyst 5. In a wound configuration, the honeycomb-like flow passages may be shifted. Also, generally square flow passages or passages of other shapes may be provided if the corrugations have a corresponding shape and/or if the apertures 13 and/or 14 are of other dimensions. Normally, the sectional area of the flow passages 12 is a multiple of the sectional area of the flow passages 11.

Figure 5:
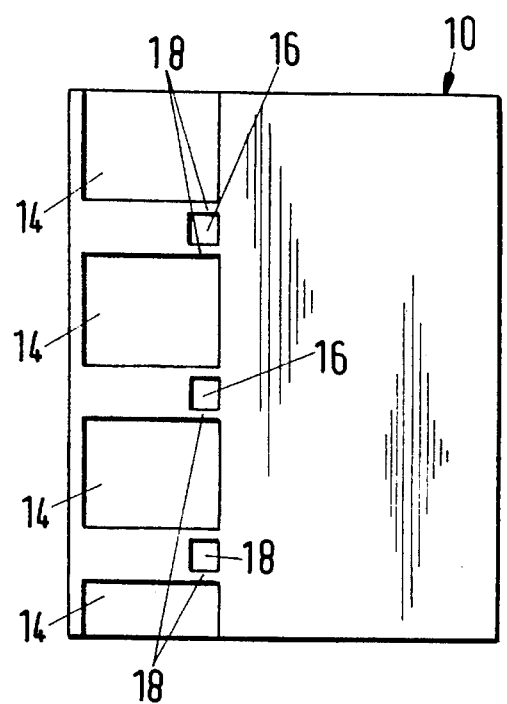
FIG. 5 is a plan view showing another representative sheet metal member used in forming the uncorrugated catalyst support prior to being welded or brazed on the corrugated sheet material.

FIG. 4 is a top view showing the metal sheet member 9 prior to corrugation but with the bend lines indicated, and FIG. 5 is a similar view showing the flat metal sheet 10, both members being in the unwound condition. These views illustrate the apertures 13 in the sheet 9 corresponding to the dotted lines and the apertures 14 in the sheet 10 corresponding to the dashed lines shown in FIG. 3. These apertures 13 and 14 are formed only in the region of the support 8 which corresponds to the precatalyst 5 and are not present in the region of the support which corresponds to the main catalyst 6.

In the intermediate zone 7, shown in FIG. 1, further apertures 15 and 16, which are comparatively short in the longitudinal direction of the converter are provided in the sheet metal members 9 and 10, respectively, as shown in FIGS. 4 and 5. As a result, only comparatively narrow webs 17 and 18 of sheet metal remain in this intermediate zone, and hence the conduction of heat between the two catalysts is substantially reduced.

The invention thus provides a substantial simplification in the manufacture of this type of an exhaust gas converter arrangement, without impairment of its properties.

Although the invention has been described herein with reference to a specific embodiment, many modifications and variations therein will readily occur to those skilled in the art. Accordingly, all such variations and modifications are included within the intended scope of the invention.

I claim:

1. An exhaust gas converter arrangement comprising a catalyst support having a precatalyst region and a main catalyst region which are spaced in the direction of exhaust gas flow through the converter, the precatalyst region being in the upstream direction and the main catalyst region being in the downstream direction and the main catalyst region being of larger size and larger mass than the precatalyst region, the catalyst support comprising corrugated and uncorrugated sheet metal members disposed in alternating sequence defining exhaust passages, each sheet metal member extending into both the precatalyst region and the main catalyst region and including an intermediate region between the precatalyst region and the main catalyst region, the sheet metal members being provided with apertures in the intermediate region which are sufficient to diminish the conduction of heat between the precatalyst region and the main catalyst region so that the precatalyst region will be heated to a start-up temperature before the main catalyst region reaches a start-up temperature wherein the exhaust passages are of generally square or triangular cross-section in the main catalyst region as a result of a corresponding shaping of the corrugations in the corrugated sheet metal member and wherein at least one of the sheet metal members has further apertures in the precatalyst region which, together with the shape of the corrugations in the corrugated sheet metal member, produce exhaust passages in the precatalyst region which have a larger cross-sectional area than the exhaust passages in the main catalyst region.

2. An exhaust gas converter arrangement according to claim 1 wherein the exhaust passages in the precatalyst are of generally honeycomb or square cross-section.

3. An exhaust gas converter arrangement according to claim 1 wherein the apertures which diminish the conduction of heat between the precatalyst region and the main catalyst region are provided in both of the sheet metal members and are aligned in the direction perpendicular to the direction of the exhaust gas flow.

4. An exhaust gas converter arrangement according to claim 1 wherein the sheet metal members are wound.

5. An exhaust gas converter arrangement according to claim 4 wherein the sheet metal members are wound into a generally cylindrical configuration.

* * * * *